US012598480B2

(12) United States Patent
Chandrasekaran et al.

(10) Patent No.: US 12,598,480 B2
(45) Date of Patent: Apr. 7, 2026

(54) COVERAGE TUNING BASED ON UPLINK AND DOWNLINK BALANCING

(71) Applicant: T-Mobile Innovations LLC, Overland Park, KS (US)

(72) Inventors: Nirmal Chandrasekaran, Hillsborough, NJ (US); Sivakumar Periyasamy, Morris Plains, NJ (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 311 days.

(21) Appl. No.: 18/456,837

(22) Filed: Aug. 28, 2023

(65) Prior Publication Data

US 2025/0080995 A1    Mar. 6, 2025

(51) Int. Cl.
| | |
|---|---|
| *H04W 16/18* | (2009.01) |
| *H04B 17/318* | (2015.01) |
| *H04L 5/00* | (2006.01) |
| *H04W 52/36* | (2009.01) |

(52) U.S. Cl.
CPC .......... *H04W 16/18* (2013.01); *H04B 17/318* (2015.01); *H04L 5/0069* (2013.01); *H04W 52/365* (2013.01)

(58) Field of Classification Search
CPC .. H04W 16/18; H04W 52/365; H04B 17/318; H04L 5/0069
USPC ......................................................... 455/446
See application file for complete search history.

(56) References Cited

U.S. PATENT DOCUMENTS

| | | |
|---|---|---|
| 11,470,619 B2 | 10/2022 | Lee et al. |
| 2015/0295691 A1 | 10/2015 | Khazaei et al. |

*Primary Examiner* — Joel Ajayi
(74) *Attorney, Agent, or Firm* — Jones Burke, PLLC

(57) ABSTRACT

A method for power balancing includes receiving data from wireless devices within a cell provided by an access node and estimating a downlink coverage distance of the cell based on signal strengths reported in the data. The method further includes estimating an average distance from the access node at which the wireless devices have insufficient transmit power to reach the access node based on the data. Additionally, the method includes comparing the downlink coverage distance to the average distance and adjusting the downlink coverage distance based on the comparison.

19 Claims, 9 Drawing Sheets

500

500

700

RECEIVE UPLINK DATA FROM GEO-
BINNED SOURCES
710

OBTAIN DISTANCE OF UE FROM
ACCESS NODE AND UPLINK
POWER AVAILABLE
720

CALCULATE MAX UL DISTANCE
730

ASSESS CELL LEVEL UL
COVERAGE
740

800

NETWORK REPORTS UPLINK DATA
FROM COUNTERS
810

OBTAIN UL POWER DISTRIBUTION
COUNTERS FOR EACH CELL
820

DETERMINE NUMBER OF UES
REACHING MAX POWER
830

ASSESS CELL LEVEL UL
COVERAGE BASED ON % OF UES
REACHING MAX POWER
840

COVERAGE TUNING BASED ON UPLINK AND DOWNLINK BALANCING

TECHNICAL BACKGROUND

A wireless network, such as a cellular network, can include an access node (e.g., base station) serving multiple wireless devices or user equipment (UE) in a geographical area covered by a radio frequency (RF) transmission provided by the access node. As technology has evolved, different carriers within the cellular network may utilize different types of radio access technologies (RATs). RATs can include, for example, 3G RATs (e.g., GSM, CDMA etc.), 4G RATs (e.g., WiMax, LTE, etc.), 5G RATs (new radio (NR)), and 6G RATs. As access nodes have evolved, networks may include a combination of multiple access node such as 4G LTE evolved NodeBs (eNodeBs or eNBs) and 5G NR next generation NodeBs (gNodeBs or gNBs) or alternatively may be exclusively 4G or 5G cellular systems.

In cellular networks, base stations or access nodes typically have higher power transmission capabilities in downlink communications than the wireless devices or UEs have in uplink communications. For this reason, the coverage area for a wireless device is typically limited by the transmission power of the wireless device. Even as the transmission power of the base station increases, if the power of the wireless device is exhausted, the wireless device cannot reach the base station with its uplink signal and thus cannot fully communicate with the base station. In less common scenarios, uplink transmission power from the wireless devices may exceed the downlink transmission power of the access node. This scenario also results in a power imbalance that impairs network performance.

Currently, no convenient method exists for optimizing a coverage area through consideration of a power balance between wireless devices in the uplink and base stations or access nodes in the downlink. While network transmission power is typically constant, methods exist to expand base station power in order to mitigate interference issues, thus increasing the above-described power imbalance. Accordingly, a solution is needed for improving network coverage by consideration of any power imbalance between wireless devices and base stations.

OVERVIEW

Exemplary embodiments described herein include systems, methods, processing nodes, and non-transitory computer readable mediums for optimizing network coverage by creating a balance of uplink and downlink power. An exemplary method includes receiving data from wireless devices within a cell provided by an access node and estimating a downlink coverage distance of the cell based on signal strengths reported in the data. The exemplary method additionally includes estimating an average distance from the access node at which the wireless devices have insufficient transmit power to reach the access node based on the data and comparing the downlink coverage distance to the average distance. The method further includes adjusting the downlink coverage distance based on the comparison.

An additional exemplary embodiment includes a system configured for optimizing network coverage. The system includes a memory storing data collected from wireless devices within a cell provided by an access node and at least one processor programmed to perform multiple operations. The operations include accessing the stored data from the memory and estimating a downlink coverage distance of the cell based on signal strengths reported in the data. The operations additionally include estimating an average distance from the access node at which the wireless devices have insufficient transmit power to reach the access node based on the data. The operations further include comparing the downlink coverage distance to the average distance and adjusting the downlink coverage distance based on the comparison.

An additional exemplary embodiment includes a method for improving network coverage by creating a power balance. The method includes estimating a downlink coverage distance of an access node based on signal strengths reported to the access node by wireless devices in a cell provided by the access node. The method further includes estimating an average distance from the access node at which the wireless devices have insufficient transmit power to reach the access node based on power head room reported by the wireless devices and comparing the downlink coverage distance to the average distance. The method further includes adjusting the downlink coverage distance to match the average distance.

Additional exemplary embodiments include processing nodes and non-transitory computer-readable mediums performing the exemplary methods. For example, a non-transitory computer readable medium or processing node may be provided for improving coverage by balancing uplink and downlink power. The non-transitory computer-readable medium or processing node stores instructions executed by a processor to perform the multiple operations.

DETAILED DESCRIPTION

Figure 1:
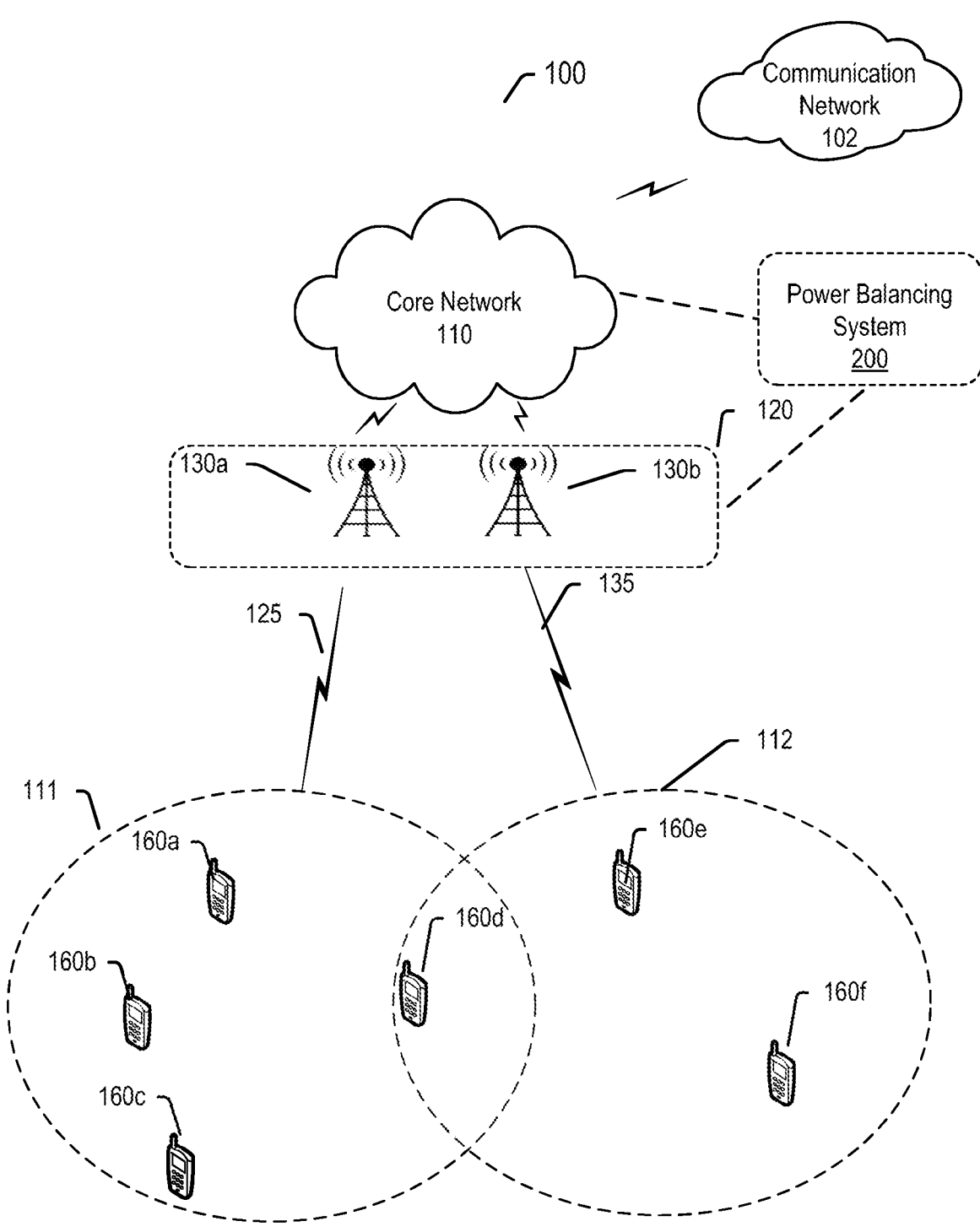
FIG. 1 depicts an exemplary operating environment in accordance with the disclosed embodiments.

Exemplary embodiments described herein include systems, methods, processing nodes and computer readable mediums for coverage tuning or optimization based on uplink and downlink balancing. Coverage tuning activity may be implemented based on a comparison of uplink and downlink coverage areas. In embodiments provided herein, coverage optimization involves tuning the reach of the signal from a cell tower of an access node to ensure as many wireless devices as possible can experience sufficient signal strength to transfer voice and data to and from the network.

In embodiments provided herein, both uplink and downlink coverage are considered in order to optimize coverage.

At the access node, heavy equipment with a large amount of transmit power is generally provided. In most cases, uplink transmission is weaker than downlink transmission and at a certain point, when wireless devices move further from the access node, they are no longer able to talk to network. The devices are then either subject to a handover or they lose coverage. Regardless of the transmit power of a given wireless device, at some distance from the communicating access node, the device will have difficulty transmitting to the access node. In some circumstances, the wireless device will be subject to a handover to another access node. However, as handovers can cause delays and interruptions and consume resources, it is often advantageous for devices to remain connected to an access node.

In embodiments disclosed herein, a method utilizes geo-binned data gathered from mobile and fixed wireless devices using the network, by considering uplink power head room (PHR), which is the difference between the currently set transmission power of the wireless device and the maximum transmission power of the wireless device. Geo-binned data is collected in combination with location and provides a convenient representation of how data is geographically distributed. The method may additionally consider downlink coverage information, such as signal strength and signal quality. In embodiments described herein, the wireless devices transmit to the base station a power headroom report (PHR), indicating the UE's current power headroom. The UE's power headroom could vary over time, as a result of the UE adjusting its transmission power and moving to different locations. Further it should be noted that wireless devices operating with a low PHR may be operating with a high transmission power and thus also a low battery level.

The PHR reports can be utilized to assess uplink coverage by determining a maximum uplink communication distance of the wireless device and further by averaging the maximum distances of all wireless devices in a cell to determine the average uplink coverage. Methods provided herein compare the coverage areas for both uplink and downlink signals and tune network coverage based on the comparison.

In embodiments set forth herein, wireless devices within a cell report their power usage to an access node or base station in the form of PHR. For each network cell, systems and methods disclosed herein may collect information regarding signal strength and signal quality. The information may, for example, be geo-binned information, such as drive test data and drive-less data collected directly from wireless devices.

Based on the collected information or data, systems and methods disclosed herein may estimate downlink coverage of a cell based on signal strengths at different geographical points. The geographical points may be defined in terms of longitude and latitude and may be available from the geo-binned data. Further, disclosed systems and methods estimate available power for wireless devices and identify an average distance at which the devices are maxing out of transmit power. This average distance may represent the estimated uplink coverage distance.

Responsive to these determinations, embodiments disclosed herein compare the uplink coverage distance with the downlink coverage distance. Based on the comparison, the downlink coverage distance may be adjusted. For example, if the downlink coverage distance is beyond or greater than the uplink coverage distance, methods and systems disclosed herein reduce the downlink coverage distance to match the uplink coverage distance. Alternatively, if the downlink coverage distance is less than or within the uplink coverage distance, methods and systems provided herein may expand the downlink coverage distance to match the uplink coverage distance. These adjustments may improve network coverage overall. In particular, embodiments set forth herein include enhanced logic for performing power balancing within a wireless network.

In embodiments disclosed herein, a cell or wireless network may be provided by an access node. The access node may utilize one or more antennas to communicate with wireless devices or user equipment (UEs), such as for example, wireless phones, Internet of Things (IoT) devices, and wireless gateway devices. Performance at a particular wireless device may be dependent on a number of factors including, for example, signal strength parameters and interference indicators.

An exemplary system described herein includes a power balancing system, at least an access node (or base station), such as an eNodeB, or gNodeB, as well as one or more end-user wireless devices. For illustrative purposes and simplicity, the disclosed technology including a power balancing system will be illustrated and discussed as being implemented responsive to the communications between an access node (e.g., a base station) and a wireless device It is understood that the disclosed technology may also be applied to communication between an end-user wireless device and various network resources, such as relay nodes, controller nodes, antennas, etc. Further, multiple access nodes may be utilized. For example, some wireless devices may communicate with an LTE eNodeB and others may communicate with an NR gNodeB.

In addition to the systems and methods described herein, the operations for power balancing may be implemented as computer-readable instructions implemented by an access node or other network nodes such as processing nodes. The processing node may include a processor included in the access node or a processor included in any controller node in the wireless network that is coupled to the access node.

FIG. 1 depicts an exemplary communication network 100. A core network 110 is coupled to a radio access network (RAN) 120 including access nodes 130a, 130b. The core network 110 and RAN 120 serve wireless devices 160a, 160b, 160c, 160d, 160e, 160f over communication links 125 and 135. The wireless devices 160a-160f can include end-user wireless devices (e.g., UEs). The communication links 125 and 135 use 5G NR, 4G LTE, 6G, or any other suitable type of radio access technology (RAT). Core network 110 can be structured as an evolved packet core (EPC) network or as a 5G core using a service-based architecture (SBA) utilizing core network functions and elements, including, for example, user plane functions (UPF) control plane functions (CPF). The core network 110 provides access to a communication network 102, such as the Internet or other packet data network.

The RAN 120 can include various access network functions and devices disposed between the core network 110 and the wireless devices 160a . . . 160f. For example, the RAN 120 includes access nodes or base stations 130a, 130b. The access nodes or base stations 130a, 130b may be or include eNodeBs and/or gNodeBs communicating with the plurality of wireless devices 160a, 160b, 160c, 160d, 160e, 160f. The access nodes 130a, 130b may operate within coverage areas 111 and 112 by deploying the links 125 and 135 respectively. The wireless links 125 and 135 may correspond to the same or different RATs, frequency bands, or bandwidths. Coverage areas 111 and 112 are shown as having a defined boundary and signal parameters may vary between the access nodes 130a, 130b and the boundaries of the coverage areas 111 and 112. Specifically, signal parameters generally deteriorate as devices progress towards the boundary of the coverage areas 111 and 112. More power is required to transmit signals closer to the boundaries of the coverage areas 111 and 112 and some wireless devices may have insufficient power for uplink transmission.

It is understood that the disclosed technology may also be applied to communication between an end-user wireless device and other network resources, depending on the RAT and network technology being implemented. Further, either of core network 110 and RAN 120 can include one or more of a local area network, a wide area network, and an internetwork (including the Internet) capable of communicating signals and carrying data, for example, to support voice, push-to-talk, broadcast video, and data communications by wireless devices 160a, 160b, 160c, 160d. Alternatively or additionally to the UPF and CPF, the illustrated network topology can include packet gateways, such as a CUPS based user plane S-GW, P-GW, or SAE-GW.

The core network 110 may incorporate many functions not shown in FIG. 1. For example, the CPF may include but are not limited to a Network Slice Selection Function (NSSF), a Network Exposure Function (NEF), a NF Repository Function (NRF), a Policy Control Function (PCF), a Unified Data Management (UDM), an Application Function (AF), a Short Message Service Function (SMSF), a Core Access and Mobility management Function (AMF), a Session Management Function (SMF), and an Authentication Server Function (AUSF). The UPF may also include, for example, a Unified Data Repository (UDR).

Communication network 102 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 122, 124, 126, 128. Wireless network protocols can comprise Multimedia Broadcast Multicast Services (MBMS), code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), Worldwide Interoperability for Microwave Access (WiMAX), Fourth Generation broadband cellular (4G, LTE Advanced, etc.), and Fifth Generation mobile networks or wireless systems (5G, 5G New Radio ("5G NR"), or 5G LTE), or 6G. Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

The exemplary operating environment 100 may further include power balancing system 200, which is illustrated as operating between the core network 110 and the RAN 120. However, it should be noted that the power balancing system 200 may operate in the core 110, in the RAN 120 or may be distributed. For example, the power balancing system 200 may utilize components located at both the core network 110 and at the multiple access nodes 130a, 130b. Alternatively, the power balancing system 200 may be an entirely discrete system operating in conjunction with the RAN 170, core 110 and/or the wireless devices 160a . . . 160f.

The power balancing system 200 receives information pertaining to signal strength, signal quality and interference from wireless devices 160a . . . 160f. For example, the power balancing system 200 may collect performance parameters such as reference signal received power (RSRP), reference signal received quality (RSRQ), signal to noise and interference ratio (SINR), and power headroom (PHR). Further, information pertaining to frequency band, bandwidth, and access technology may also be transmitted. In embodiments set forth herein, the wireless devices 160a . . . 160f may send these parameters to the access nodes 130a and 130b, which convey the parameters to the power balancing system 200. The power balancing system 200 analyzes this information in accordance with a stored model in order to balance uplink and downlink power and improve network performance.

Wireless devices 160a . . . 160f may be any device, system, combination of devices, or other such communication platform capable of communicating wirelessly with RAN 120 using one or more frequency bands deployed therefrom. Each of the wireless devices 160a . . . 160f may be, for example, a mobile phone, a wireless phone, a wireless modem, a personal digital assistant (PDA), a voice over internet protocol (VOIP) phone, a voice over packet (VOP) phone, or a soft phone, as well as other types of devices or systems that can exchange audio or data via RAN 120. Wireless devices 160a . . . 160f may also include, for example Internet of Things (IoT) devices or home internet (HINT) devices.

Other network elements may be present to facilitate communication but are omitted for clarity, such as base stations, base station controllers, mobile switching centers, dispatch application processors, and location registers such as a home location register or visitor location register. Components not specifically shown in FIG. 1 can further include processing nodes, controller nodes, routers, gateways, and physical and/or wireless data links for communicating signals among various network elements, additional base stations, controller nodes, telephony switches, internet routers, network gateways, computer systems, communication links, or other type of communication equipment, and combinations thereof.

Figure 2:
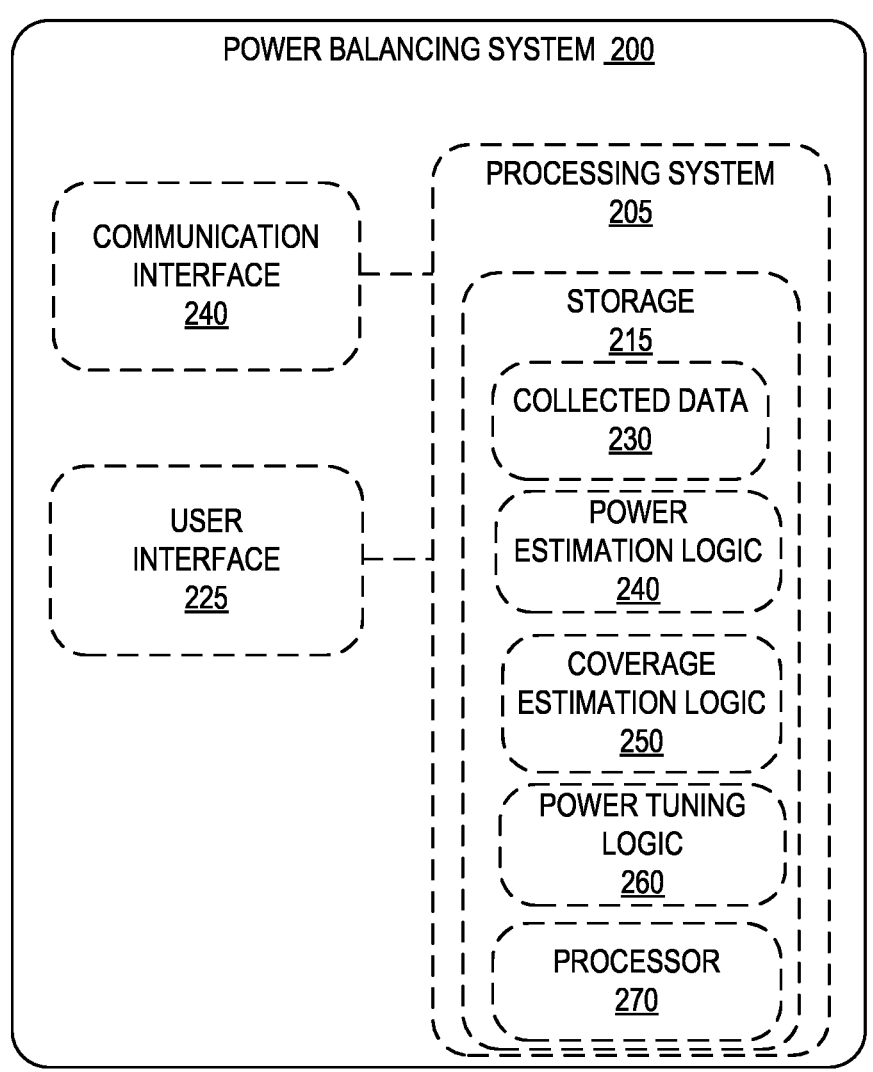
FIG. 2 depicts an exemplary power balancing system in accordance with disclosed embodiments.

FIG. 2 illustrates a power balancing system 200 in accordance with embodiments described herein. The components described herein are merely exemplary as many different configurations for the power balancing system 200 may be implemented. The power balancing system 200 may be configured to perform the methods and operations disclosed herein to balance uplink and downlink power in order to improve network performance. In the disclosed embodiments, the power balancing system 200 may be integrated with each access node 130a, 130b, integrated with the core network 110 or may be an entirely separate component capable of communicating with at least the wireless devices 160a . . . 160f and the RAN 120.

The power balancing system 200 may be configured for collecting data transmitted by the wireless devices 160a . . . 160f to the access nodes 130a, 130b. To perform power balancing, the power balancing system 200 may utilize a processing system 205. Processing system 205 may include a processor 210 and a storage device 215. Storage device 215 may include a RAM, ROM, disk drive, a flash drive, a memory, or other storage device configured to store data and/or computer readable instructions or codes (e.g., software). The computer executable instructions or codes may be accessed and executed by processor 205 to perform various methods disclosed herein. Software stored in storage device 215 may include computer programs, firmware, or other form of machine-readable instructions, including an operating system, utilities, drivers, network interfaces, applications, or other type of software. For example, software stored in storage device 215 may include a module for performing various operations described herein. For example, power estimation logic 240 may store instructions to estimate uplink and downlink power. Coverage estimation logic 250 may utilize the power estimates to determine a coverage area. Additionally power tuning logic 260 may adjust downlink power based on a comparison of the uplink and downlink coverage. Further, the memory 215 may store collected data at 230, which may be or include data collected from the wireless devices 160*a* . . . 160*f*.

To perform the above-described operations, the power estimation logic 240, coverage estimation logic 250, and power tuning logic 260 may be executed by the processor 270 to operate on the collected data 230. The access technology may include, for example, 4G LTE, 5GSA, 5G NSA, or 6G. Other parameters, such as the particular frequency band or SINR may alternatively or additionally be considered.

Processor 270 may be a microprocessor and may include hardware circuitry and/or embedded codes configured to retrieve and execute software stored in storage device 215. The power balancing system 200 further includes a communication interface 220 and a user interface 225. Communication interface 220 may be configured to enable the processing system 205 to communicate with other components, nodes, or devices in the wireless network. For example, the power balancing system 200 receives relevant parameters from an access node 130*a*, 130*b* or from the wireless devices 160*a* . . . 106*f*.

Communication interface 220 may include hardware components, such as network communication ports, devices, routers, wires, antenna, transceivers, etc. User interface 225 may be configured to allow a user to provide input to the power balancing system 200 and receive data or information from access node 130*a*, 130*b* or the wireless devices 160*a* . . . 160*f*. User interface 225 may include hardware components, such as touch screens, buttons, displays, speakers, etc. The power balancing system 200 may further include other components such as a power management unit, a control interface unit, etc.

The location of the power balancing system 200 may depend upon the network architecture. As set forth above, the power balancing system 200 may be located in the core network 110, in a separate processing node, in the RAN 120, in multiple locations or may be an entirely discrete component. Further, although shown as a single integrated system, the functions of data collection, power estimation, coverage estimation, and power balancing may be separated and disposed in separate locations.

Figure 3:
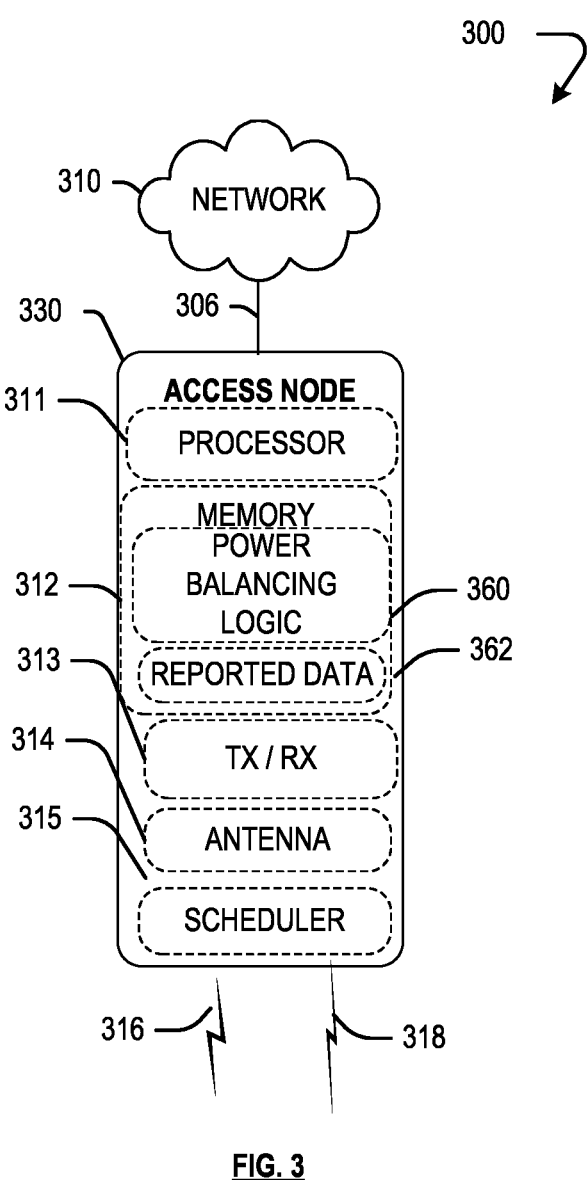
FIG. 3 depicts an exemplary access node in accordance with disclosed embodiments.

FIG. 3 illustrates an operating environment 300 for an exemplary access node 330 in accordance with the disclosed embodiments. In exemplary embodiments, access node 330 can include, for example, a gNodeB or an eNodeB. Access node 330 may comprise, for example, a macro-cell access node, such as access nodes 130*a* and 130*b* described with reference to FIG. 1. Access node 330 is illustrated as comprising a processor 311, memory 312, transceiver(s) 313, and antenna(s) 314, and scheduler 315. Processor 311 executes instructions stored on memory 312, while transceiver(s) 313 and antenna(s) 314 enable wireless communinication with other network nodes, such as wireless devices described herein, and other nodes. For example, wireless devices 160*a* . . . 160*f* may initiate uplink transmissions such that the transceivers 313 and antennas 314 receive messages from the wireless devices, for example, over communication links 316 and 318 and pass the messages to a mobility entity in the core network. Further, the transceivers 313 and antennas 314 receive signals from the mobility entity such as a mobility management entity (MME) or access and mobility function (AMF) and pass the messages to the appropriate wireless device 160*a* . . . 160*f*. Scheduler 315 may be provided for scheduling resources based on the presence and performance parameters of the wireless devices. The access node 330 may connect over a communication link 306 to a network 310. Network 310 may be similar to core network 110 discussed above.

In embodiments provided herein, the memory 312 may further store reported data at 362. The reported data 362 may be data collected from the wireless devices 160*a* . . . 160*f*, such as performance parameters including SINR, RSRP, and/or RSRQ and PHR. Thus, a processor from the power balancing system 200 may communicate with the access node 330 in order to receive relevant data from the reported data 362. Further, in some embodiments, the access node 330 may include power balancing logic 362 that reports the relevant data to the power balancing system 200 in a manner required by the power balancing system 200. In other embodiments, the power balancing system 200 may be wholly incorporated in the access node 330.

Figure 4:
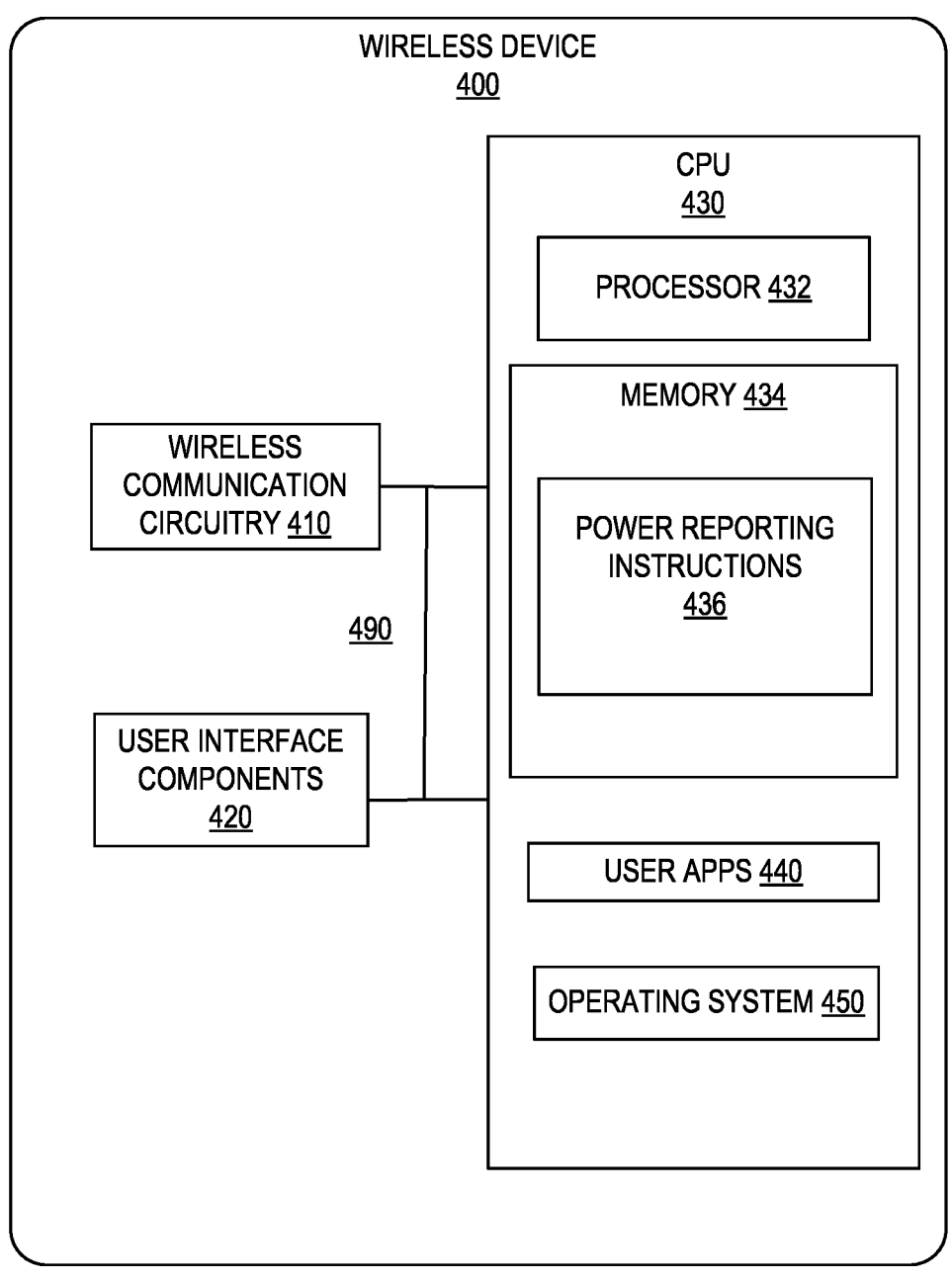
FIG. 4 depicts an exemplary wireless device in accordance with disclosed embodiments.

FIG. 4 depicts a wireless device or (UE) 400 in accordance with disclosed embodiments. The wireless device 400 may correspond to one of wireless devices 160*a* . . . 160*f* in FIG. 1. As illustrated, the wireless device 400 includes wireless communication circuitry 410, user interface components 420, a central processing unit (CPU) 430, processor 432, memory 434, user apps 440, and operating system 450. Components may be connected, for example, by a bus 490. These components are merely exemplary and the wireless device 400 may include a larger or smaller number of components capable of performing the functions described herein. Wireless devices such as smartphones may have multiple microprocessors and microcontrollers. A microprocessor may have a bus to communicate with memory on separate chips and buses to communicate with the rest of the equipment. Alternatively or additionally, the mobile phone may include a System On a Chip (SoC).

The memory 434 may store, for example, power reporting instructions 436. When executed by the processor 432, the power reporting instructions 436 may cause the wireless device 400 to send reports to the access node 330 or directly to the power balancing system 200. The reports may include, for example, a location of the wireless device 400, PHR, SINR, RSRP, RSRQ and/or other parameters indicative of signal strength, quality, or location. Additionally, the wireless device 400 may report its make and model (e.g., iPhone® or Android® 8, 10, 14, etc.) as well as the service it is currently using.

The wireless communication circuitry 410 may include circuit elements configured to generate wireless signals (e.g., one or more antennas) as well as interface elements configured, for example, to translate control signals from the CPU 430 into data signals for wireless output. Further, the wireless communication circuitry 410 may include multiple elements, for example to communicate in different modes with different RATs. The CPU 430 may be configured to receive, interpret, and/or respond to signals received via the wireless communication circuitry 410. The CPU 430 may be configured to receive a network command to perform other specified functions. The user interface components 420 may be or include any components enabling a user to interact with the wireless device 400.

Figure 5:
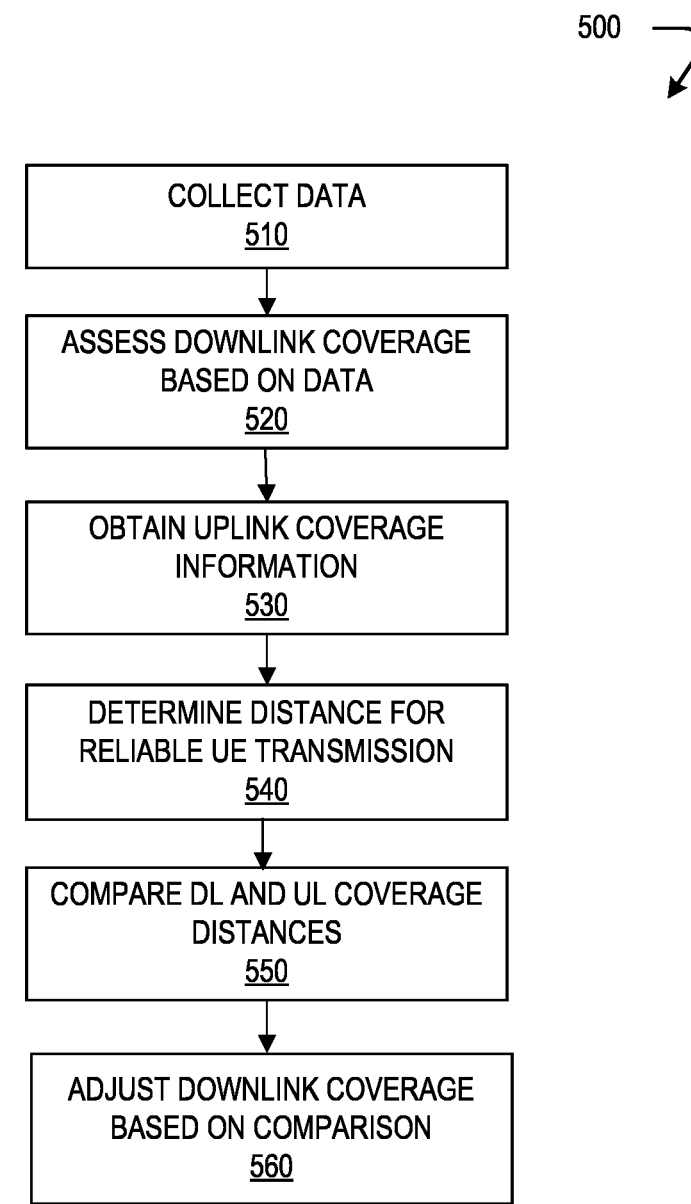
FIG. 5 is a flow chart illustrating a method for power balancing in accordance with one disclosed embodiment.

The disclosed methods for power balancing or coverage tuning are further described below with reference to FIGS. 5-8. FIG. 5 illustrates an exemplary method 500 performed by a power balancing system 200. Method 500 may be performed by any suitable processor discussed herein, for example, the processor 270 included in the power balancing system 200 or any other suitable processor. For the sake of convenience, the method is described as being performed by the processor 270.

Method 500 starts in step 510, when the processor 270 collects data from the wireless device 160a . . . 160f or from a database populated with information from the wireless devices 160a . . . 160f. . . . In embodiments set forth herein, the processor 270 may collect data from every wireless device in a cell or from every wireless device in multiple cells. The power balancing system 200 may collect this data directly from the wireless devices 160a . . . 160f or alternatively from the access nodes 130a 130b, depending on the location of the power balancing system 200. The data may for example, include for example, RSRP, RSRQ, SINR, and PH. In some embodiments, the data may include geo-binned information, such as from a drive test log, but the data may further be driveless data collected from the wireless devices directly. The data set is collected in step 510 so that both uplink and downlink coverage information can be assessed from the data.

In step 520, the processor 270 assesses downlink coverage based on the collected data. For example, the processor 270 estimates the downlink coverage provided by the access node 130a, 130b based on signal strengths at different geographical points. For example, the downlink coverage is determined based on the signal strengths reported by the wireless devices 160a . . . 160f from different locations. The processor 270 is aware of the locations of the wireless devices and thus utilizes this information in conjunction with signal strength to assess downlink coverage. Further, in some embodiments, longitude and latitude may be available from geo-binned data in order to assist with assessing downlink coverage. Based on this determination, the downlink coverage can be defined as a distance from the access node at which a sufficiently strong signal can be received. The determination of a sufficiently strong signal threshold can be determined based on the network.

In step 530, the processor 270 obtains uplink coverage information. For example, the processor 270 retrieves geo-binned data or obtains PHR received from the wireless devices. Based on this coverage information, in step 540, processor 270 uses the reported PHR from the wireless devices or other geo-binned data to determine a distance from the wireless device 160a . . . 160f to the access node 130a, 130b for reliable uplink transmission. Thus, the processor 270 estimates available power for devices at various locations. Based on this determination, the processor 270 identifies distances at which the wireless devices 160a . . . 160f are maxing out of transmit power. In embodiments set forth herein, the processor 270 may calculate an average distance at which all of the wireless devices in a cell run out of transmit power on the uplink. This distance is the estimated "uplink coverage" distance or the distance for reliable wireless device transmission in the cell.

In step 550, the processor 270 compares downlink and uplink coverage distances to determine which coverage is overextended. In most instances, because of the heavy equipment and transmit power available at the access node, the downlink coverage will be overextended. However, in some instances, the uplink coverage may be overextended. For example, high power user equipment (HPUEs) have more transmit power than other wireless devices. Some RATs are particularly suited to HPUEs. Therefore, in such an instance, the uplink coverage may be overextended.

In step 560, unless the uplink and downlink coverage distances are the same or within a threshold distance of one another, the processor 270 provides an instruction to adjust the coverage of the access node 130a, 130b. For example, an instruction is provided to adjust antenna tilt and power at the access node 130a, 130b to extend or contain downlink coverage to an optimal distance.

Figure 6:
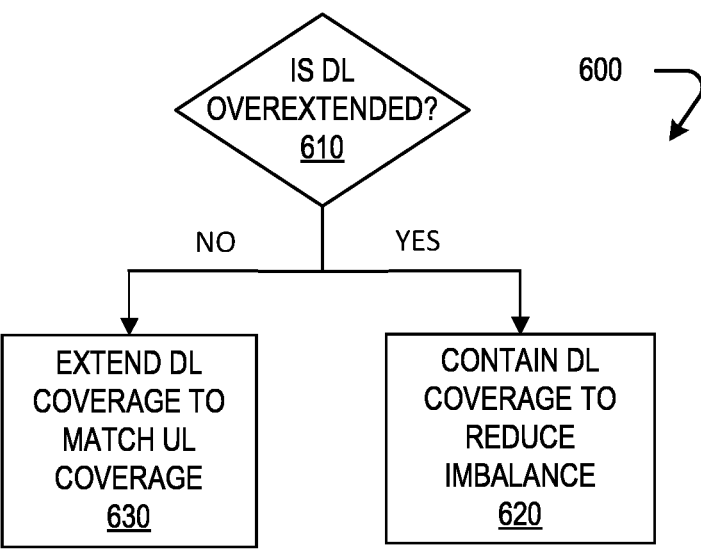
FIG. 6 is a flow chart illustrating additional details of a method for power balancing in accordance with a disclosed embodiment.

FIG. 6 illustrates a further method 600 for power balancing in accordance with embodiments set forth herein. In particular, the method 600 illustrates a method for adjusting downlink power based on the above-described comparison. Method 600 may be performed by a processor, for example, the processor 270 in the power balancing system 200. Alternatively, the steps may be performed by a processor of an access node, or another processor in the system. For the sake of illustration, the method is described as being performed by the processor 270.

Method 600 starts in step 610, when the power balancing system 200 compares the downlink coverage and the uplink coverage and determines if the downlink coverage is overextended. If the downlink coverage is found to be overextended in step 610, the processor 270 provides an instruction to contain the downlink coverage to reduce the imbalance in step 620. The actual containment may occur, for example, by reducing the transmit power of the access node 330, decreasing a number of antennas transmitting from the access node 330, or by changing antenna tilt of the access node 330. This adjustment creates an optimal downlink and uplink balance.

However, if in step 610, the processor 270 finds that the downlink coverage is not overextended and that the uplink coverage exceeds the downlink coverage, the processor 270 generates an instruction in step 630 to increase the downlink coverage of the access node 330 to match the uplink coverage of the wireless devices. The adjustment may be performed, for example, by increasing antenna transmit power at the access node 330, increasing a number of antennas transmitting from the access node 330, or changing antenna tilt at the access node 330. This adjustment helps improve overall network coverage by creating a balance.

Figure 9A:
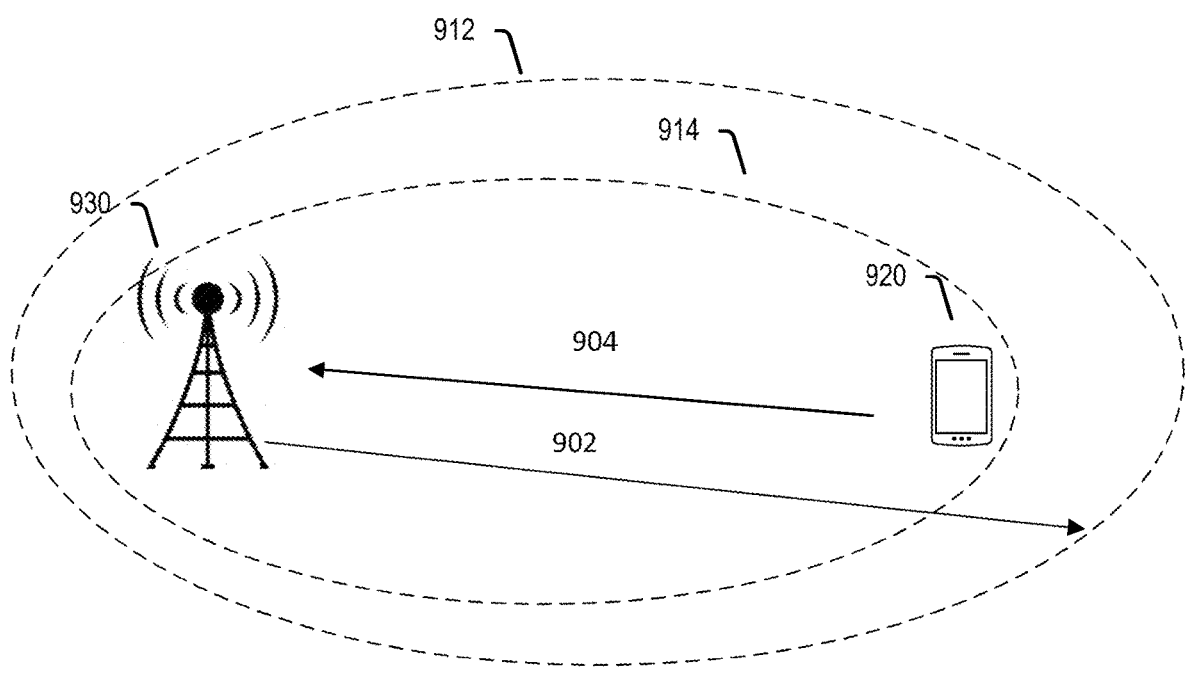
FIGS. 9A and 9B illustrate examples of power balancing in accordance with embodiments disclosed herein.
Figure 9B:
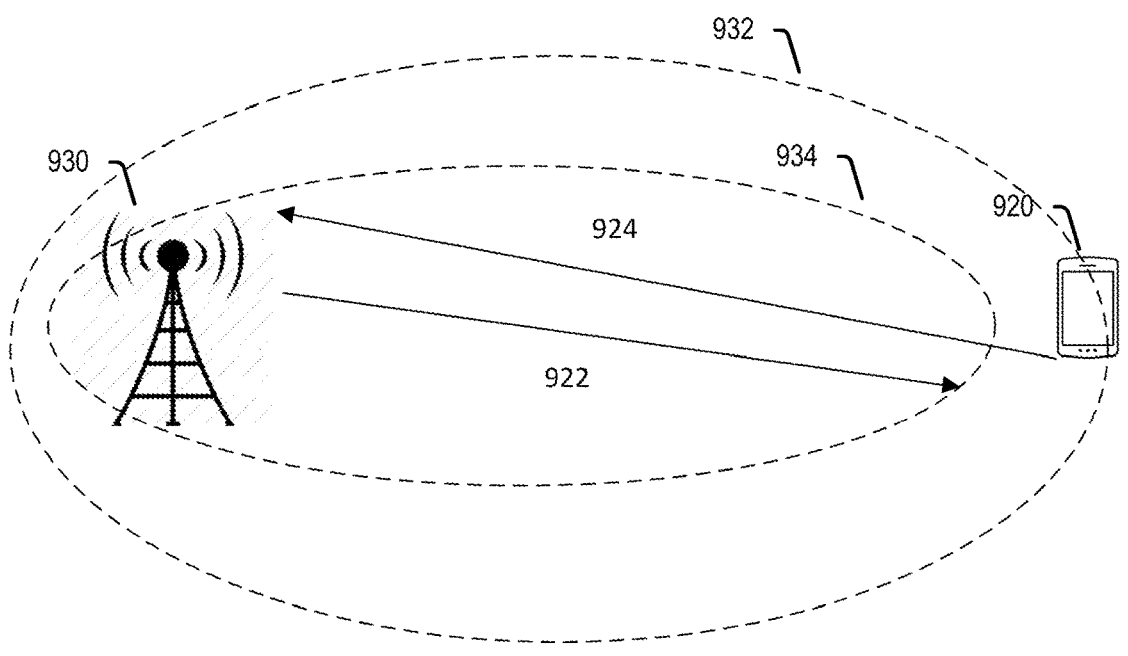

FIGS. 9A and 9B provide examples of the scenarios described with respect to FIG. 6. In FIG. 9A, an access node 930 sends downlink signals 902, which based on their transmission distance may define a coverage area 912. A representative wireless device 920 sends an uplink signal 904. Boundary 914 may define the maximum reach of the uplink signal 904. Thus in the illustrated example, the downlink coverage distance defined by the coverage area 912 exceeds the uplink coverage distance defined by the coverage area 914. In this scenario, the processor 270 of the power balancing system 200 instructs the access node 930 to contain its downlink power as explained with respect to step 620.

In FIG. 9B, the access node 930 sends a downlink signal 922. The reach of the downlink signal 922 is designated by coverage area 934. The wireless device 920 transmits an uplink signal 924. The reach of the uplink signal is defined by the coverage area 932. In this instance, the uplink signal 924 reaches further than the downlink signal 922. This scenario may be tied to an access node set at a very low power or alternative, the cell may contain a high percentage of HPUEs having multiple transmitters that can successfully transmit from a greater distance than other wireless devices. Accordingly, as described above with respect to step 630 of FIG. 6, the processor 270 of the power balancing system 200 increases the downlink coverage of the access node 930 to match the uplink coverage reach of the signal 924.

Figure 7:
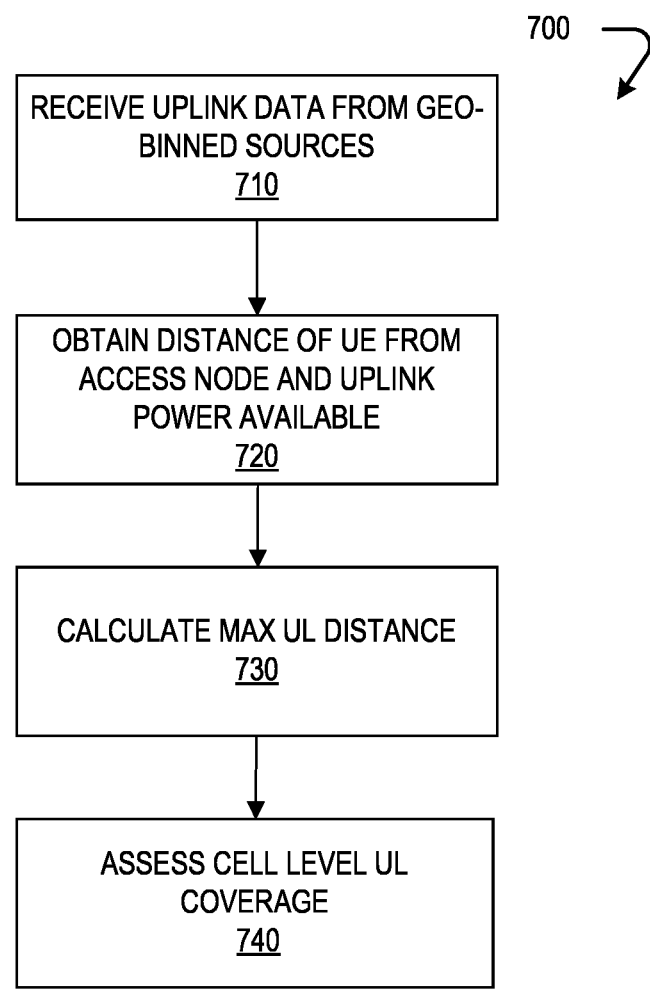
FIG. 7 is a flow chart illustrating a method for power balancing in in accordance with a disclosed embodiment.

FIG. 7 illustrates a further method 700 for power balancing in accordance with embodiments set forth herein. Specifically, FIG. 7 illustrates a method 700 for assessing uplink coverage. Method 700 may be performed by a processor, for example, the processor 270 in the power balancing system 200. Alternatively, the steps may be performed by a processor of an access node, or another processor in the system. For the sake of illustration, the method is described as being performed by the processor 270.

Method 700 starts in step 710, when the power balancing system 200 receives uplink data from geo-binned sources. The uplink data may be or include drive testing data driveless tuning or crowd sourced data from wireless devices that is stored in databases. From these databases, the processor 270 may obtain the geo-binned data, which includes coordinates from different points. While in some embodiments, the wireless devices may each report their location, in other embodiments, wireless device locations can be determined by triangulation. This is applicable, for example, to wireless devices that lack location reporting capabilities.

In step 720, the processor 270 obtains a distance of each wireless device 160*a* . . . 160*f* from the access node 130*a*, 130*b* and uplink power available from the wireless devices 160*a* . . . 160*f*. Based on this received information, in step 730, the processor 270 calculates a maximum uplink coverage distance of the wireless device 160*a* . . . 160*f* toward the access node 130*a*, 130*b*. Based on this maximum uplink coverage distance calculated in step 730, the processor 270 assesses cell level uplink coverage in step 740, for example, by calculating an average maximum uplink distance per wireless device.

Figure 8:
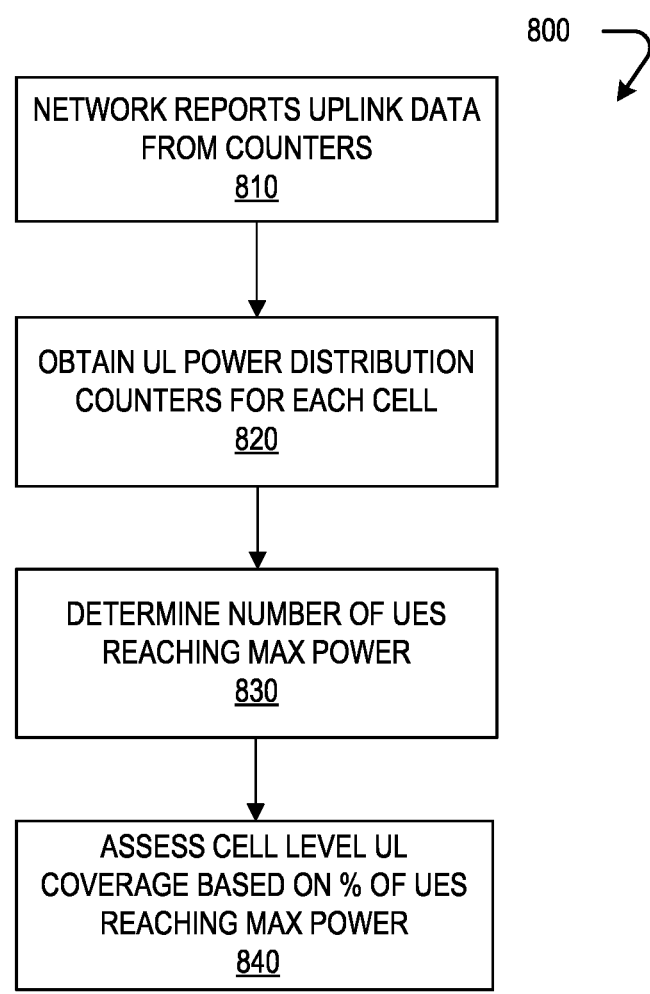
FIG. 8 is a flow chart illustrating a power balancing method in accordance with an additional disclosed embodiment.

FIG. 8 illustrates a further method 800 for power balancing in accordance with embodiments set forth herein. Specifically, method 800 illustrates an alternative method of assessing uplink coverage. Method 800 may be performed by a processor, for example, the processor 270 in the power balancing system 200. Alternatively, the steps may be performed by a processor of an access node, or another processor in the system. For the sake of illustration, the method is described as being performed by the processor 270.

Method 800 starts in step 810, when the power balancing system 200 receives reports from the network of uplink data collected by counters in the network. In step 820, the processor 270 obtains uplink power distribution counters for each cell in the network. While the counters typically exist within the network, the counters do not generally reveal the location of the wireless devices, thus resulting in less geographical precision than geo-binned data. Using the pre-existing counters provides a simpler and less expensive alternative to utilizing geo-binned data. Based on the uplink power distribution counters for each cell in the network, the processor 270 determines a number of wireless devices reaching their maximum power in step 830. Finally, in step 840, the processor 270 assesses cell level uplink coverage based on a percentage of wireless devices in the cell reaching maximum power.

Accordingly, methods provided herein provide improved power balancing in order to enhance overall network performance. When wireless devices transmit on the uplink side at maximum power for long periods of time, battery life is greatly shortened. Accordingly, methods disclosed herein also improve battery life for wireless devices and provide a better customer experience. Further, the above-described processes can be performed repeatedly in order to make small incremental adjustments in order to achieve an optimal power balance over time.

In some embodiments, methods 500, 600, 700, and 800 may include additional steps or operations. Furthermore, the methods may include steps shown in each of the other methods. As one of ordinary skill in the art would understand, the methods 500, 600, 700, and 800 may be integrated in any useful manner.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

The methods, systems, devices, networks, access nodes, and equipment described herein may be implemented with, contain, or be executed by one or more computer systems and/or processing nodes. The methods described above may also be stored on a non-transitory computer readable medium. Many of the elements of communication network 100 may be, comprise, or include computers systems and/or processing nodes, including access nodes, controller nodes, and gateway nodes described herein.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:

receiving, by a base station, geo-binned data from wireless devices within a cell provided by the base station;

estimating, by the base station, a downlink coverage distance of the cell based on signal strengths reported in the geo-binned data;

calculating, by the base station, utilizing the signal strengths reported in the geo-binned data, an average distance from the base station at which the wireless devices have insufficient transmit power to reach the base station based on the geo-binned data comparing, by the base station, the downlink coverage distance to the average distance; and adjusting, by the base station, the downlink coverage distance to match the average distance.

2. The method of claim 1, further comprising obtaining a distance of the wireless devices from the base station and uplink power available for the wireless devices based on the received geo-binned data.

3. The method of claim 2, further comprising calculating a maximum uplink distance for the wireless devices.

4. The method of claim 3, further comprising assessing cell level uplink coverage based on the maximum uplink distance.

5. The method of claim 1, further comprising obtaining uplink power distribution counters for each base station.

6. The method of claim 5, further comprising determining a number of wireless devices reaching a maximum power based on the uplink power distribution counters.

7. The method of claim 6, further comprising determining a percentage of wireless devices reaching the maximum power based on the number.

8. The method of claim 7, further comprising assessing cell level uplink coverage based on the percentage of wireless devices.

9. The method of claim 1, further comprising determining the average distance is less than the downlink coverage distance.

10. The method of claim 9, further comprising reducing the downlink coverage distance to match the average distance.

11. The method of claim 1, further comprising determining the average distance is greater than the downlink coverage distance.

12. The method of claim 11, further comprising expanding the downlink coverage distance to match the average distance.

13. A system comprising:

a base station having a memory storing data collected from wireless devices within a cell provided by a base station; and at least one processor programmed to perform operations including:

accessing stored geo-binned data from the memory;

estimating a downlink coverage distance of the cell based on signal strengths reported in the geo-binned data;

calculating, utilizing the signal strengths reported in the geo-binned data, an average distance from the base station at which the wireless devices have insufficient transmit power to reach the base station based on the data;

comparing the downlink coverage distance to the average distance; and adjusting the downlink coverage distance to match the average distance.

14. The system of claim 13, the operations further comprising determining the average distance is less than the downlink coverage distance.

15. The system of claim 14, the operations further comprising reducing the downlink coverage distance to match the average distance.

16. The system of claim 13, the operations further comprising determining the average distance is greater than the downlink coverage distance.

17. The system of claim 16, the operations further comprising expanding the downlink coverage distance to match the average distance.

18. A method comprising:

receiving, by a base station, geo-binned data from wireless devices within a cell provided by the base station;

estimating, by the base station, a downlink coverage distance of the base station based on signal strengths reported to the base station by wireless devices in a cell provided by the base station;

calculating, by the base station, utilizing the signal strengths reported in the geo-binned data, an average distance from the base station at which the wireless devices have insufficient transmit power to reach the base station based on power head room reported by the wireless devices;

comparing, by the base station, the downlink coverage distance to the average distance; and adjusting, by the base station, the downlink coverage distance to match the average distance.

19. The method of claim 18, further comprising estimating the average distance based on geo-binned data collected from the wireless devices.

* * * * *